March 31, 1931.  O. B. WELKER ET AL  1,798,239
LUGGAGE CARRIER
Filed March 14, 1929
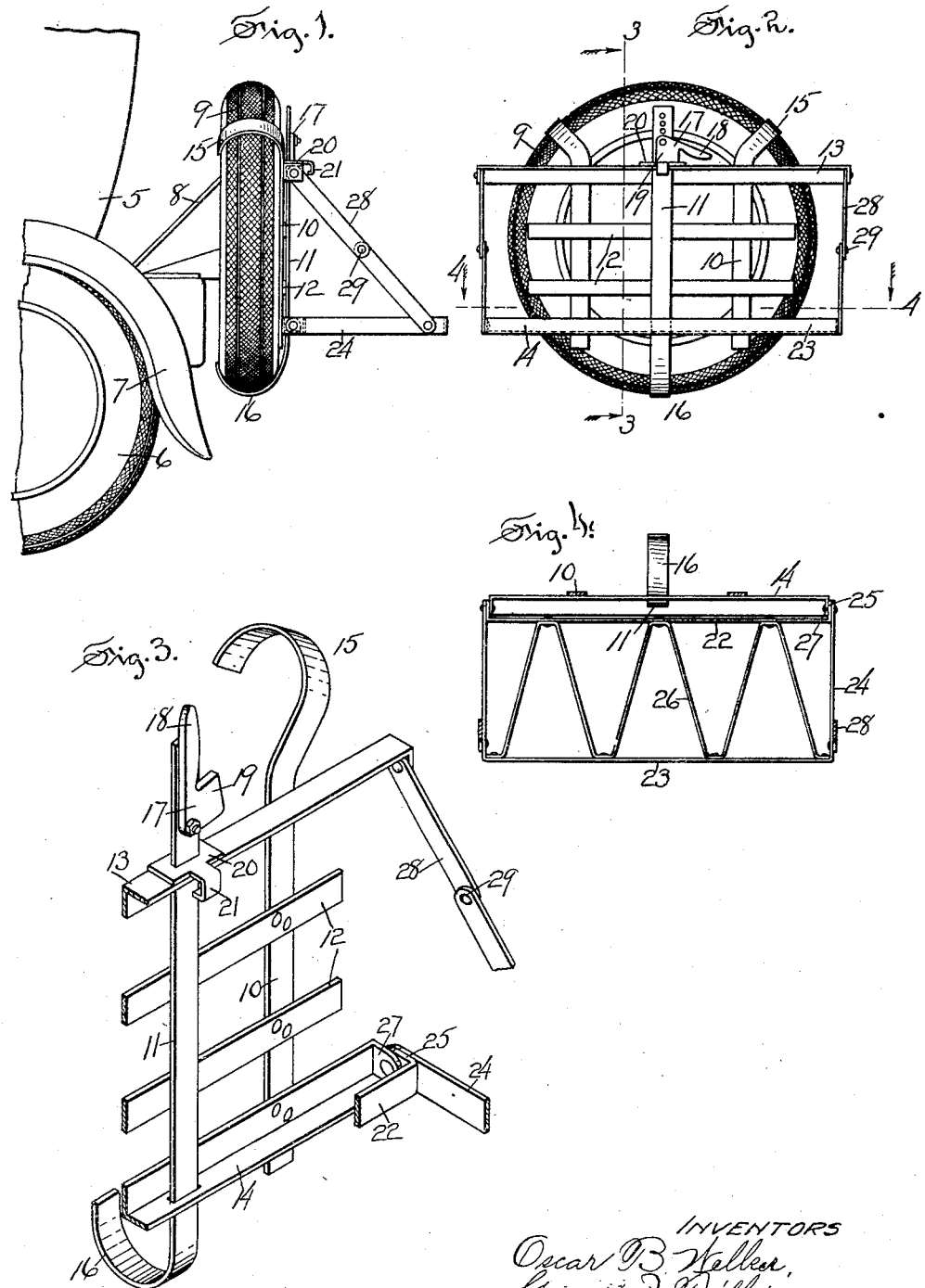
INVENTORS
Oscar B. Welker,
George J. Trilling,
by Arthur B. Jenkins.
ATTORNEY Patented Mar. 31, 1931

1,798,239

UNITED STATES PATENT OFFICE

OSCAR B. WELKER, OF MIDDLETOWN, CONNECTICUT, AND GEORGE I. TRILLING, OF NEW YORK, N. Y.; SAID WELKER ASSIGNOR TO THE WELKER-HOOPS MANUFACTURING COMPANY, OF MIDDLETOWN, CONNECTICUT, A CORPORATION OF CONNECTICUT

LUGGAGE CARRIER

Application filed March 14, 1929. Serial No. 346,919.

Our invention relates more particularly to the class of carriers employed in connection with automobiles or other vehicles, and an object of our invention, among others, is the production of a carrier that may be readily placed in position and that may be readily displaced, the structure as herein shown being adapted for attachment to the spare tire usually carried in the rear of the vehicle.

One form of a carrier embodying our invention and in the construction and use of which the objects herein set out, as well as others, may be attained is illustrated in the accompanying drawings, in which—

Figure 1 is a view in side elevation of the rear portion of an automobile and in side elevation of our carrier attached to the spare tire of said automobile.

Figure 2 is a front view of the carrier.

Figure 3 is an isometric view, scale enlarged, of a portion of the carrier illustrating its construction, the section being on a plane denoted by the dotted line 3—3 of Figure 2.

Figure 4 is a view in section on a plane denoted by the dotted line 4—4 of Figure 2.

In the accompanying drawings the numeral 5 denotes the body of an automobile, 6 a wheel, 7 a mud guard, and 8 a spare tire rack forming a part of said automobile and all of which may be of ordinary form and construction, the tire rack being equipped to support a spare tire 9 that is secured in place in any ordinary manner.

Our new carrier comprises a back and a bottom or luggage rest, the latter being pivotally attached to the back at or near the lower edge thereof in such a manner that it may be pivotally raised and secured against the front of the back. These parts may be of various forms, our invention not being limited to the particular form herein illustrated and described.

This form, however, satisfactorily answers our purpose and said back is of the form of a frame and comprises base bars 10, a clamping bar 11, cross bars 12, a top bar 13 and a bottom bar 14. The base bars 10 are located somewhat near the ends of the cross bars 12, and as shown in Figure 2 of the drawings, and the top and bottom bars are located somewhat near the top and bottom edges of the structure, the cross and the top and bottom bars being secured to the base bars in any suitable manner, as by riveting. In order to give strength and rigidity to the structure, the top and bottom bars are of angular construction and they are somewhat longer than the cross bars.

The base bars 10 have at their ends hooks 15 of a shape to fit over and partially surround the tire 9 on opposite sides of a vertical line extending centrally across the tire. The clamping bar 11 is slidably mounted, in the structure herein shown this bar extending through slots in the top and bottom bars, and as shown in Figure 3 of the drawings, these slots being formed in that portion of each bar angularly disposed with respect to the bars 10. A clamping lever 17 is pivotally mounted on the bar 11, this lever comprising a handle 18 and a clamping toe 19 that is adapted, when the handle is swung to a horizontal position, to thrust against the bar 13, or a part thereon, and thereby draw the bar 11 into firm and tight contact with the tire 9, this pressure of the hook 16 being resisted by the hooks 15, thereby securely fastening the frame in place. The toe 19 is so formed and located that the pressure exerted by the clamping action will hold the lever in its clamping position. A series of holes may be formed in the bar 11 to receive the pivot of the clamping lever, thereby enabling the positioning of said lever to accommodate the device for use with different sizes of tires.

In the structure herein shown a holder plate 20 is mounted on the horizontal portion of the top bar 13, this plate having a slot through which the bar 11 extends. This plate, in the form of the device herein shown, takes the thrust of the toe 19 when the clamping bar is drawn into position to secure the frame. A holder 21, in the form of a hook, projects from the plate 20 into position to receive a shelf and retain it in its closed position when not in use.

This shelf is somewhat in the form of a grid, comprising side bars 22—23 and end bars 24. In the special form of structure herein shown the end bars are formed by bending opposite ends of the side bars 23, and as shown in Figure 4 of the drawings, these ends being secured in any suitable manner to bent ends 25 at opposite ends of the side bar 22. A grid 26, formed by bending a strip of metal back and forth, is secured at its ends and at its bent portions to the bars 22—23 in any suitable manner, and as shown in Figure 4 of the drawings. This shelf is pivotally secured to supporting ears 27 bent inwardly at opposite ends of the cross bar 14 and as shown in Figure 3 of the drawings, this construction permitting the shelf to be pivotally raised to a closed position when not required for use or to be extended into a horizontal position to receive luggage or similar matter.

As a means for retaining the shelf in its supporting position supporting bars 28 are secured at opposite ends at or near the outer edge of the shelf, the ends of these bars opposite the shelf being secured to the top bar 13. In order to permit the shelf to have the pivotal movement hereinbefore referred to a joint 29 is formed intermediate the ends of each supporting bar, the opposite ends of the bars being pivotally attached to the shelf and to the bar 13.

From the foregoing description it will be seen that our improved carrier may be readily secured in place on the spare tire of an automobile, and may be as readily removed therefrom. When not required for use the shelf may be raised to an inoperative position, and when so raised the side bar 23 will be engaged by the holder 21 and said holder will be prevented from being disengaged from the bar, the retention of the holder being effected by the action of the clamping toe 19 of the clamping lever.

In accordance with the provisions of the patent statutes I have described the principles of operation of my invention, together with the device which I now consider to represent the best embodiment thereof; but I desire to have it understood that the device shown is only illustrative, and that the invention may be carried out by other means and applied to uses other than those above set out.

I claim:

1. A luggage carrier comprising a back including base members, means for rigidly securing said base members in fixed spaced relation, supporting hooks on the ends of said base members, a clamping bar movably attached to said back and having a hook, the inner sides of the supporting hooks facing the inner side of the clamping bar hook, means carried by the clamping bar and engageable with the back for securing the clamping bar in clamped position, and a luggage supporting member projecting from said back.

2. A luggage carrier comprising a back including base members, means for securing said base members in fixed spaced relation, supporting hooks on corresponding ends of said base members, a clamping bar slidably attached to said back substantially midway between said base members and having a hook opposed to the hooks on the base members, the inner sides of the supporting hooks facing the inner side of the clamping bar hook, cooperating means independently carried by the back and clamping bar for securing the clamping bar in clamped position, and a luggage supporting member projecting from said back.

3. A luggage carrier comprising a back including base bars, means for securing said bars in fixed spaced and parallel relation, supporting hooks disposed laterally of the bars on corresponding ends thereof and in relative divergent positions, a clamping bar slidably attached to said back substantially midway between the parallel base bars and having a hook on the end opposite the hooks on the base bars, the inner sides of the supporting hooks facing the inner side of the clamping bar hook, means for securing the clamping bar in clamped position, and a luggage supporting member projecting from said back.

4. A luggage carrier comprising a back including base members, means for securing said members in fixed spaced relation, supporting hooks on the ends of said members, a clamping bar movably attached to said back and having a hook, the inner sides of the supporting hooks facing the inner side of the clamping bar hook, a clamping lever pivotally mounted on said clamping bar outwardly of the back and having a laterally offset clamping toe, means to receive the thrust of said toe to draw the bar into clamping position, and a luggage supporting member projecting from said back.

5. A luggage carrier comprising a back including base bars, means for securing said bars in fixed spaced relation, supporting hooks on the ends of said bars, a clamping bar movably attached to said back between the supporting bars and having a hook, the inner sides of the supporting hooks facing the inner side of the clamping bar hook, a clamping lever pivotally mounted on the clamping bar and having a laterally offset clamping toe, means for adjustably changing the position of said lever relative to the back, and a luggage supporting member projecting from said back.

6. A luggage carrier comprising a back including base members and cross members secured thereto, said cross members including a bar of angular shape in cross section, supporting hooks on the ends of said base members, a clamping bar movably attached to said back and having a hook, the inner sides of the supporting hooks facing the inner side of the clamping bar hook and said clamping bar extending through a slot in one side of the angularly shaped bar, a clamping lever pivotally mounted on the clamping bar and having a clamping toe to engage said angularly shaped bar, and a luggage supporting member projecting from said back.

7. A luggage carrier comprising a back including base members, cross members and top and bottom cross bars said cross bars being of angular shape in cross section, a clamping bar slidably mounted in slots in sides of said top and bottom cross bars, a clamping member pivotally mounted on said clamping bar to thrust against one of said cross bars to force the clamping member into clamping position and retain it in such position, supporting hooks on the ends of the base members and clamping bar, the inner sides of the supporting hooks facing the inner sides of the clamping hook, and a luggage supporting member projecting from said back.

8. A luggage carrier comprising a back including base members and top and bottom cross bars, the latter of angular shape in cross section with one side of each secured against the base members and the opposite side projecting at an angle therefrom, supporting hooks on the ends of the base members, a clamping bar slidable through slots in the angularly disposed sides of said cross bars, a hook on said clamping bar having its inner side facing the inner sides of the hooks on the ends of the base members, a clamping lever pivotally mounted on the clamping bar and having a clamping toe to engage the angularly disposed side of one of the cross bars, and a luggage supporting member projecting from said back.

9. A luggage carrier comprising a back including base members, an upper cross bar and a lower cross bar of angular shape in cross section with one side secured against said base members, and the other side projecting at an angle thereto, supporting hooks on the ends of said base members, a clamping member movably attached to said back and having a clamping hook, the inner sides of the supporting hooks facing the inner side of the clamping hook, means on the clamping member engageable with the upper cross bar for anchoring the back in position, ears formed by bending the ends of one of the sides of the cross bar, and a luggage supporting member pivotally secured to said ears.

10. A luggage carrier comprising a back including base members and a cross bar of angular shape in cross section with one side secured against said base members and the other side projecting at an angle thereto, supporting hooks on the ends of said base members, a clamping bar slidably attached to the back and projecting through a slot in the angularly disposed side of the cross bar, a clamping hook on the clamping bar, the inner sides of the supporting hooks facing the inner side of the clamping hook, and being opposed to each other, means on the clamping bar engageable with the back for anchoring the latter in position, ears formed by bending the ends of the side of the cross bar that is secured against the base members, and a luggage supporting member pivotally secured to said ears.

11. A luggage carrier comprising a back, said back including base members with supporting hooks and a movably mounted clamping member with a clamping hook, said back also including a cross member having its ends bent to form ears, a luggage supporting member comprising end bars pivotally attached to said ears and side bars rigidly secured to said end bars and means associated with the clamping member for holding the luggage supporting member in raised inoperative position.

12. A luggage carrier comprising a back with supporting members therefor, a clamping bar movably supported on said back, a luggage supporting member pivotally attached to said back, a holder to engage said luggage supporting member in a closed position and a clamping lever pivotally attached to said clamping bar and positioned to engage said holder to retain the same engaged with the luggage supporting member.

13. A luggage carrier comprising a back with supporting bars therefor and a cross member of angular shape in cross section, a clamping bar movably supported by said back and extending through a slot in an angularly disposed side of said cross member, a holder plate resting against said angularly disposed side of the cross member and having a slot through which said clamping bar extends, a luggage supporting member pivotally attached to said back, a holder projecting from said holder plate to engage and secure said luggage supporting member, and means for holding said clamping bar in clamping position.

14. A luggage carrier comprising a back, said back including a cross bar of angular shape in cross section, with one of the sides having its ends bent to form supporting ears, means for supporting the back, and a luggage supporting member comprising side bars, one of which has bent ends to engage said ears, pivots to connect said ears to said bent ends, end bars connecting said side bars, and a grid extending back and forth between the side bars.

GEORGE I. TRILLING.
OSCAR B. WELKER.